(12) United States Patent
Tuttle et al.

(10) Patent No.: US 7,734,512 B2
(45) Date of Patent: Jun. 8, 2010

(54) METHOD FOR CREATING A CUSTOMER CUSTOMIZABLE LAMP

(75) Inventors: Michael T. Tuttle, Carmel, IN (US); Jennifer J. Tuttle, Carmel, IN (US)

(73) Assignee: Inhabit, Inc., Indianapolis, IN (US)

( * ) Notice: Subject to any disclaimer, the term of this patent is extended or adjusted under 35 U.S.C. 154(b) by 0 days.

(21) Appl. No.: 12/038,039

(22) Filed: Feb. 27, 2008

(65) Prior Publication Data
US 2009/0216658 A1 Aug. 27, 2009

(51) Int. Cl.
*G06Q 30/00* (2006.01)
(52) U.S. Cl. .................. 705/26; 705/1; 705/27
(58) Field of Classification Search ............ 705/26, 705/27
See application file for complete search history.

(56) References Cited

U.S. PATENT DOCUMENTS

| | | | |
|---|---|---|---|
| 2,918,243 | A | 12/1959 | Johnson et al. |
| 4,228,489 | A | 10/1980 | Martin |
| 4,509,105 | A | 4/1985 | Short, Sr. |
| 4,789,122 | A | 12/1988 | Gutgsell |
| 5,381,326 | A | 1/1995 | Yeh |
| 5,523,934 | A | 6/1996 | Dworman et al. |
| 5,598,652 | A | 2/1997 | Nurre |
| 6,052,669 | A * | 4/2000 | Smith et al. .......... 705/26 |
| 6,135,622 | A | 10/2000 | Downing |
| 6,484,169 | B1 * | 11/2002 | Wilsford ............... 707/6 |
| 7,072,733 | B2 * | 7/2006 | Magee et al. ........ 700/133 |
| 2003/0172003 | A1 * | 9/2003 | Holbrook et al. ...... 705/27 |
| 2005/0027553 | A1 * | 2/2005 | Samet ................... 705/1 |
| 2007/0276721 | A1 * | 11/2007 | Jackson ................. 705/10 |
| 2008/0033843 | A1 * | 2/2008 | Warton et al. .......... 705/27 |
| 2008/0313055 | A1 * | 12/2008 | Stinson et al. ......... 705/27 |

OTHER PUBLICATIONS http://www.custom-lamps.com dated Feb. 5, 2007 accessed via the Internet Archive.*
http://www.hoylamps.com dated Feb. 10, 2007 accessed via the Internet Archive.*
http://www.custom-lamps.com dated Feb. 5, 2007 accessed via the Internet Archive.*
http://www.hoylelamps.com dated Feb. 10, 2007 and Aug. 9, 2007 accessed via the Internet Archive.*

* cited by examiner

*Primary Examiner*—Jason Dunham
(74) *Attorney, Agent, or Firm*—Maginot, Moore Beck LLP

(57) ABSTRACT

A customer-customizable lamp includes a vertical support post mounted to a base plate. The customer selects from five different heights of decorative blocks to be mounted on the post. Each selected block may be provided in any one of five selectable colors or four selectable simulated wood grains. The selection of blocks and finishes are made on a web page with an interactive representation of the customizable lamp being displayed as the design is being created by the customer. The remaining height on the support post to be filled with decorative blocks is displayed. Once the post is filled and the customer has selected finishes for each selected block, the lamp design can be finalized for delivery to the customer. The customer selectable blocks and colors/finishes permit several million permutations so that the customer can create a highly individualized decorative lamp.

6 Claims, 3 Drawing Sheets

METHOD FOR CREATING A CUSTOMER CUSTOMIZABLE LAMP

BACKGROUND

The present invention relates to lamp constructions, and particularly to a lamp that is customizable by the customer.

Interior decorating for a house, apartment or office certainly involves personal taste. Style, layout, texture and color combine to create a desired look, mood or impression. However, for the individual customer, most interior decorating is limited to fixed selections provided by companies or designers. To be sure, most customers are not willing to pay the high price for a true custom design for furniture and accessories. Thus, it is much more cost-effective and efficient for companies to provide a limited selection of styles, materials and colors for interior decorating items.

For many interior decorating decisions, the general style of the furniture and accessories is relatively easily determined. For instance, the size and layout of a room will dictate the type of furniture that can be effectively used in that room. The style of the furniture chosen by the customer—i.e., Louis XVI, retro, new age, etc.—generally dictates the shape and design of the decorating items. However, in most cases, the most difficult interior decorating decisions are driven by the color and material. In many respects, color is the most personal choice in interior decorating. Color and color combinations can speak volumes about an individual. Moreover, the color of a decorating item is more readily noticed, whether consciously or unconsciously, than the overall shape of the furniture or accessory item.

Most customers crave choice, perhaps especially in the field of home décor. The need for a wide range of choices is especially acute for those who hope to use interior decoration as a statement of personal expression. However, the needs of inexpensive mass-produced decorating items inherently limit choice. There is a need for interior decorating items that can be mass-produced, that are affordable and that provide the customer with seemingly infinite design options in color and material.

DESCRIPTION OF THE ILLUSTRATED EMBODIMENTS

Figure 1:
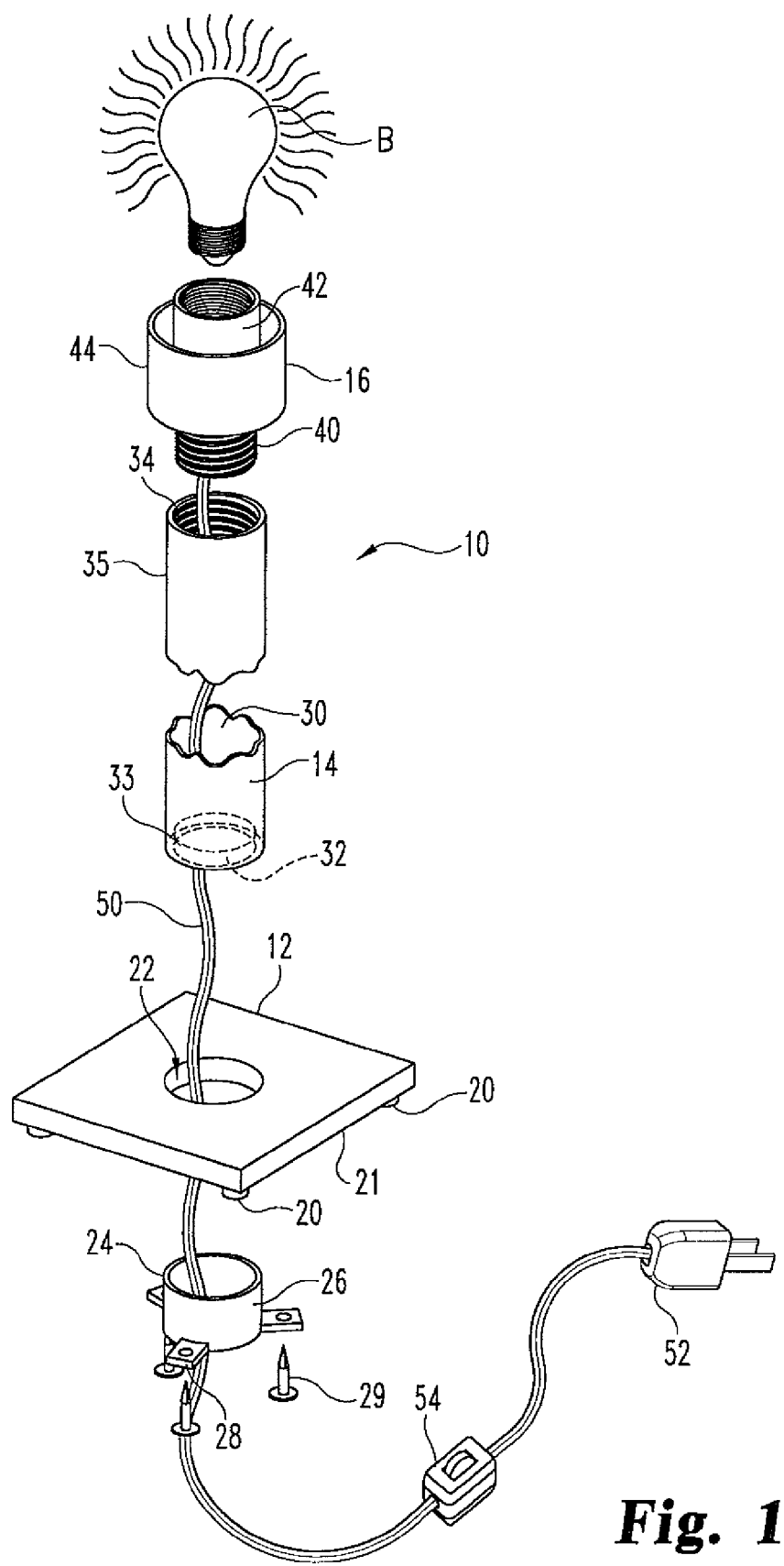
FIG. 1 is an exploded view of components of a customizable lamp according to one embodiment of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In one embodiment of the invention, a customizable lamp base 10 is provided as shown in FIG. 1. The base 10 includes a base plate 12, a support post 14 and a light fixture 16 that is configured to support a lamp shade (not shown) and a light bulb B. The base plate 12 preferably includes a plurality of feet 20 adapted for supporting the configurable lamp on a table surface. Most preferably the feet 20 are formed of a rubber or similar material to prevent the lamp from slipping on the table surface.

The base plate 12 defines a hole 22 that is preferably centrally located within the plate to provide a stable support for the remainder of the customizable lamp. In a preferred embodiment, an externally threaded collar 24 is disposed within the hole 22, with sufficient clearance to accommodate the lower end of the support post 14. The collar 24 includes external threads 26 that engage internal threads 32 at the lower end 33 of the post 14 to form an interface for connecting the post to the base plate. The collar 24 can include a plurality of tabs 28 extending radially outwardly for engagement with the underside 21 of the base plate 12. Fasteners 29, such as screws or tacks, can extend through openings in the tabs to fasten the collar 24 to the base plate 12.

As indicated, the support post 14 includes internal threads 32 at the lower end 33. Preferably, the hole 22 in the base plate 12 provides a close fit relative to the outer diameter of the post 14. For instance, in one specific embodiment, the post has an outer diameter of 1.48 inches, while the hole 22 has a diameter of 1.50 inches. This close fit helps ensure a tight construction of the finished customizable lamp.

Figure 3:
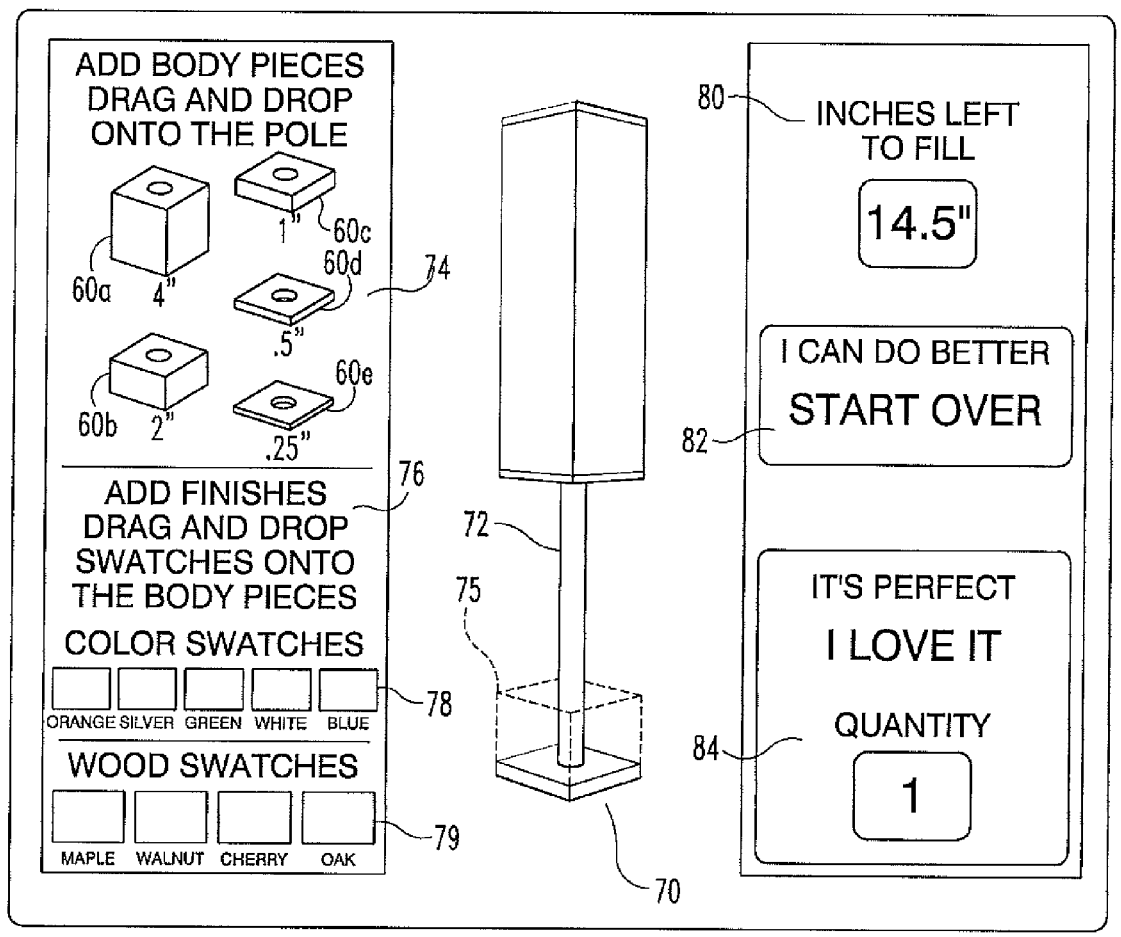
FIG. 3 is a view of a screen from an on-line system for customer customization of a lamp according to a further aspect of the invention.

The post 14 defines a tubular channel 30 along the length of the post for passage of an electrical power cord 50 extending from the light fixture 16. The light fixture 16 includes a threaded stem 40 that is adapted to engage internal threads 34 at the upper end 35 of the support post 14 to form an upper interface for connecting the light fixture to the post. The fixture includes a bulb support 42 that is configured for threaded engagement with a light bulb B. The fixture 16 may also be configured as necessary to support a lamp shade in a known manner, as depicted in FIG. 3. The fixture 16 includes a collar 44 that has a diameter larger than the outer diameter of the support post for reasons explained below.

The light fixture 16 provides electrical connection for the power cord 50. The power cord 50 extends through the tubular channel 30 of the support post, through the threaded collar 24 and beneath the base plate 12. The cord terminates in a plug 52 and preferably includes an integral switch 54. The tubular channel 30 is sized to permit passage of the plug 52 and switch 54 therethrough.

In accordance with one aspect of the present invention, the customizable lamp is customized by the customer on a web site, as illustrated on the screen print of FIG. 3. The customer thus orders the components of the lamp on the web site, the components are delivered to the customer, and then assembled. Thus, the base plate 20, support post 14 and light fixture 16 are shipped unassembled, although the threaded collar 24 is preferably pre-installed on the base plate. These components can be readily assembled without tools, by first threading the post 14 onto the threaded collar 24 extending through the opening 22 in the base plate 12. As explained in more detail below, the light fixture 16 is not immediately threaded onto the post.

In accordance with one important feature of the invention, the exterior appearance of the lamp is completely customizable by the customer. In particular, the present invention contemplates an array of differentially sized decorating blocks 60a, 60b, 60c, 60d and 60e. All of the blocks include a central hole 62 extending therethrough. The hole 62 is sized to fit snugly over the support post 14, as represented by the arrow in FIG. 2. Thus, in the specific embodiment described above, the holes 62 can have a diameter of 1.50 inches, which is slightly larger than the 1.48 inch outer diameter of the post 14.

Figure 2:
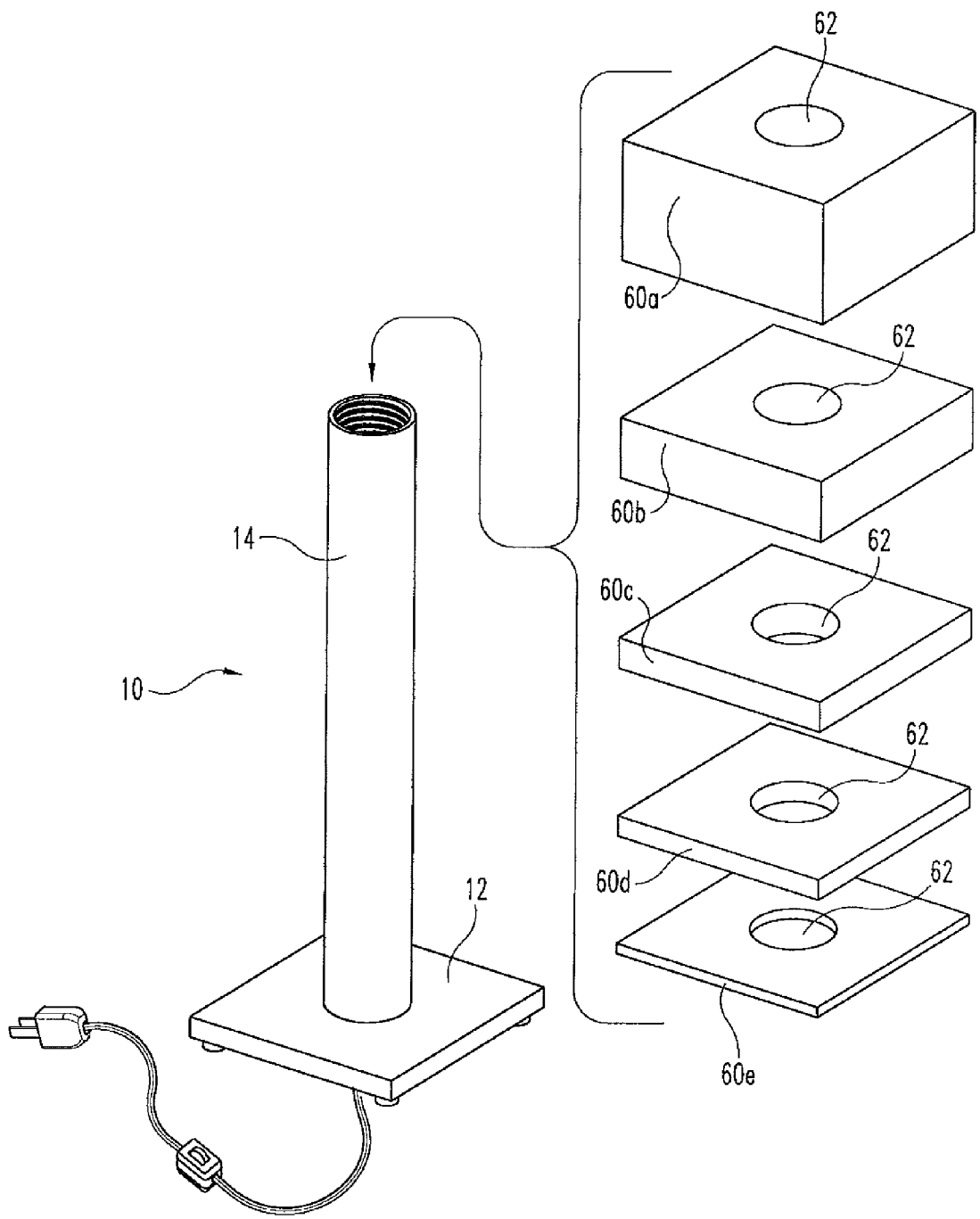
FIG. 2 is a perspective view of additional components of the customizable lamp shown in FIG. 1.

As shown in FIG. 2, each of the decorating blocks has a different height. In one specific embodiment, the height of each successive block doubles. Thus, the thinnest block 60e may have a height of 0.25 inches, so that the following blocks will have heights of 0.50 inches (block 60d), 1.00 inches (block 60c), 2.00 inches (block 60b) and 4.00 inches (block 60a). These sizes for the decorating blocks 60a-e are based on the blocks having a square plan view with sides of 5 inches in length. It can be noted that the base plate 12 also preferably has the same plan view and dimensions as the decorating blocks. The decorating blocks are also sized relative to the overall height of the customizable lamp. In one specific embodiment, the support post 14 is sized to provide 14½ inches of customizable height between the base plate 12 and the light fixture 16 when the fixture is fastened to the post. This height is typical for a table lamp; however, it is contemplated that other post heights may be provided.

In accordance with the present invention, the customer may select any combination of decorative blocks 60a-e to fill the exposed height of the support post. For instance, for a 14½ inch height, the customer can select three of the larger blocks 60a, totaling 12 inches in height, one 2 inch height block 60b and one ½ inch height block 60d. Alternatively, the stack of decorative blocks may include four ¼ inch blocks 60e (totaling one inches in height), three ½ inch blocks 60d (adding 1½ inches in height), four 1 inch height blocks 60c (totaling an additional four inches in height), and four 2 inch height blocks 60b (totaling eight inches). Adding an extra dimension to the customizable design, the customer may stack the selected decorative blocks in any configuration. For instance, in the last example the blocks may be stacked in the following order: 60b-60e-60c-60b-60e-60d-60b-60e-60c-60d-60b-60e-60c-60d-60c. In fact, the four different sizes among the fifteen decorative blocks in this example may be stacked in any one of over 15 million arrangements (15!/(3!*4!*4!*4!). In the first example, the number of possible arrangements of the five total blocks (three of one size and one each of two other sizes) is only twenty (5!/3!).

The number of potential arrangements increases significantly with another aspect of the present invention—the ability to select the color or finish of each of the chosen decorative blocks. As indicated above, one feature of the present invention resides in the ability of the customer to build the customizable lamp by making online selections. Thus, as shown in FIG. 3, a web page 70 displays the decorative blocks, or body pieces, 60a-e in segment 74. The customer may drag and drop a selected one of the decorative blocks onto the representation 72 of the customizable lamp. As each block is dropped onto the representation, it appears as a representation 75, each successive block stacked upon the blocks that were previously dragged and dropped. In one aspect, the web page includes a countdown display 80 that indicates how much of the total height remains for adding blocks. For instance, if the initial height is 14½ inches, as shown in FIG. 3, the addition of a four inch block 60a would result in decrementing the display to 10½ inches. Likewise, next adding a ½ inch block 60d would cause the height display to change to 10 inches.

Adjacent the representation 72 are additional buttons that can be clicked by the customer. The button 82 restarts the selection process and removes all block representations 75 from the lamp representation 72. The button 84 completes the design and perfects the order of the customized lamp for delivery.

The web page includes a section 76 from which the customer may select the color or finish of any block in the stack. Thus, as shown in FIG. 3, the section 76 can include an array of color choices 78 or any array of simulated wood grain choices 79. In the illustration, five color choices and four finish choices are offered. In operation, the customer simply drags and drops a color or a finish onto a block representation 75. The customer can create a color stack and then modify the colors/finishes as well as the arrangement of decorative block sizes on the representation 72 to achieve a customized design that meets his/her needs. Thus, the web page 70 provides an automatic interactive way to see how the final product will look before finalizing the selection.

In the illustrated embodiment of FIG. 3, five colors and four wood grains are available. However, it is understood that fewer or greater numbers of decorative colors and simulated wood grains may be provided, within practical limits dictated by the ability to produce and maintain an inventory of decorative blocks. Obviously, limiting the available colors/finishes works better for mass production since fewer individual items need to be produced and inventoried. On the other hand, limiting the available colors/finishes inherently limits the customer's choices. A trade off between ease of manufacture and customization is necessary when a decision is made as to what colors/finishes will be offered.

Once the customer has finalized his/her selection of decorative blocks, the order can be finalized by clicking box 84 on the web page 70. The components of the customizable lamp 10 are packaged and shipped to the customer. The lamp can be assembled as previously described with the decorative blocks stacked onto the support post 12. The light fixture 16 is added once the last block has been added to the stack. The collar 44 of the fixture 16 has a diameter that is larger than the hole 62 through the decorative blocks. Thus, the collar will bear against the uppermost block when the fixture is threaded onto the upper end 35 of the post buy engaging external threads 40 with the internal threads 34 of the post. Thus, the light fixture 16 will finalize the construction and complete the customizable lamp. It can be appreciated that the entire assembly may occur without the use of any tools, since hand-tightening of the post 14 onto the threaded collar 24 and of the light fixture 16 onto the post is sufficient.

In the preferred embodiment, the decorative blocks 60a-e are formed of wood or a pulp product that can be readily provided with any of the selectable finishes or colors. The blocks are also preferably hollow to minimize material requirements and the weight of the blocks. The support base 12 and post 14 are preferably formed of a lightweight metal, such as aluminum.

In the illustrated embodiment, the post 14 and the corresponding openings 62 in the decorative blocks are circular. The blocks are held against rotation by pressure between the light fixture 16 and the support base 12 when the light fixture is threaded onto the end of the support post 14. Alternatively an anti-rotation feature may be incorporated between the post and the decorative blocks. This feature may be in the form of a non-circular interface between the post and the openings in the blocks.

In addition, in the illustrated embodiments, the decorative blocks are cubic in shape since this shape is relatively easy to manufacture. However, other shapes for the decorative blocks and base plate may be contemplated, such as circular or triangular.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, in the illustrated embodiment, the lower interface between the post and the base plate, and the upper interface between the light fixture and the support post may be modified. Specifically, the interfaces may be press-fit, snap fit, or bayonet-type rotary engagements. For the lower interface, the opening 22 may include internal threads to engage external threads on the lower end 33 of the post 14. Alternatively, the base plate may include a threaded collar projecting from the upper surface of the plate for engagement with the threads 32 of the post.

What is claimed is:

1. A method for customer customization of a lamp comprising:

providing a base plate, a support post having a height and connectable at its lower end to the base plate and a light fixture connectable to the upper end of the support post, the light fixture for assembly by the customer;

providing an interactive online web page bearing a representation of a customizable lamp with a section including representations of a plurality of customer-selectable decorative blocks, each representation corresponding to a decorative block adapted to be mounted on the support post when the support post is connected to the base plate and prior to connecting the light fixture to the support post, each of the plurality of decorative blocks having differing heights;

permitting the customer to select from representations of the decorative blocks and to drag-and-drop a selected block onto the representation of the customizable lamp, the customer selection continuing until the height of the support post has been filled with selected decorative blocks;

decrementing a height indicator displayed on the web page in response to customer selection of a decorative block by an amount equal to the height of the selected decorative block added to the representation of the customizable lamp;

providing a section of the online web page with a plurality of customer-selectable finishes for the decorative blocks;

permitting the customer to select one of the plurality of finishes for each of the selected decorative blocks, with the customer-selected colors appearing on the representation of the customizable lamp; and providing a section of the online web page for the customer to finalize the customized lamp.

2. The method of claim 1, wherein the decorative blocks are provided in five different heights.

3. The method of claim 2, wherein the decorative blocks are provided in heights of ¼, ½, 1, 2 and 4 inches.

4. The method of claim 1, wherein the plurality of finishes includes five different colors.

5. The method of claim 4, wherein the plurality of finishes includes four simulated wood finishes.

6. The method of claim 1, wherein the plurality of finishes includes four simulated wood finishes.

* * * * *